May 25, 1965   J. J. McCARTHY   3,184,816
QUICK-RELEASE FASTENING AND LOCKING DEVICE
Filed Aug. 18, 1961   2 Sheets-Sheet 2
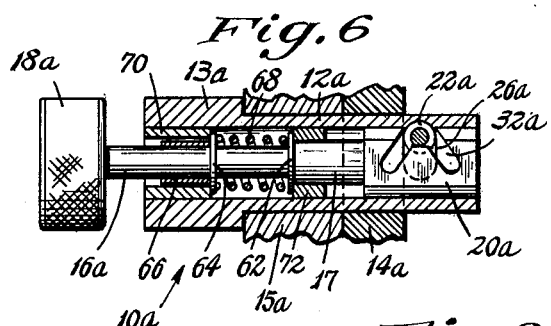
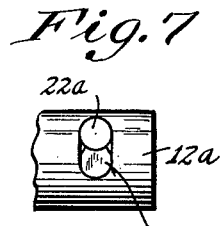
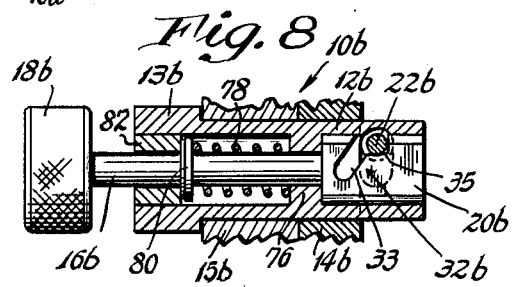
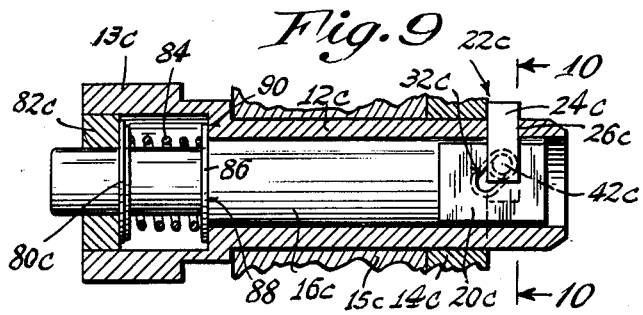
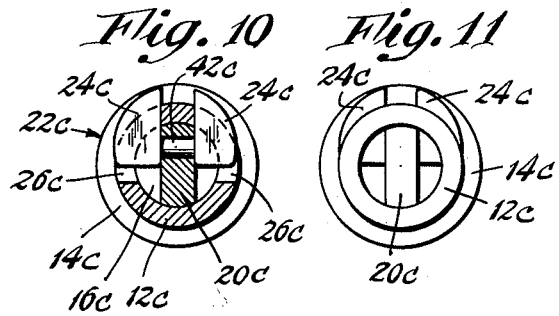
INVENTOR.
John J. McCarthy
BY
AGENT

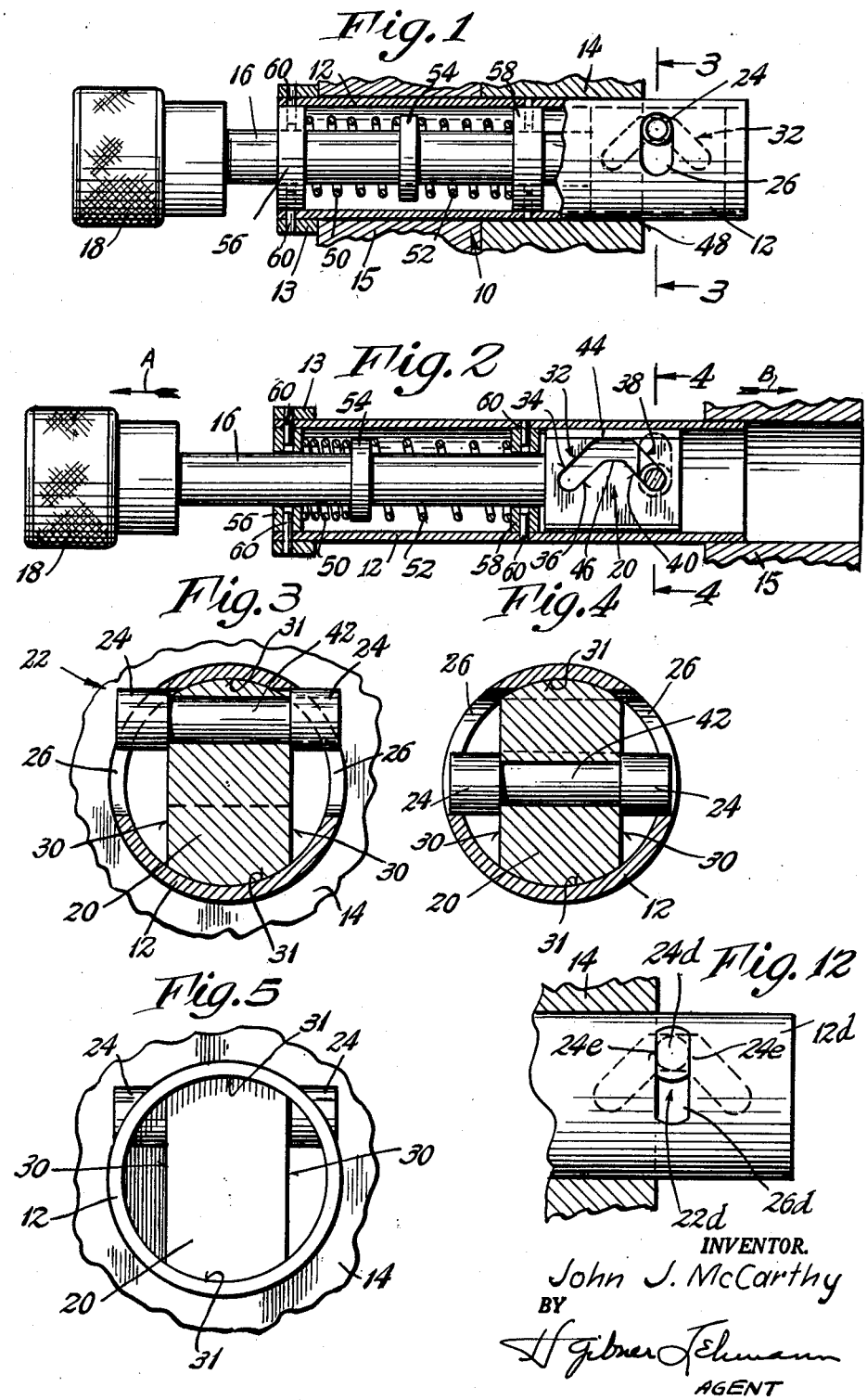

United States Patent Office 3,184,816
Patented May 25, 1965

3,184,816
QUICK-RELEASE FASTENING AND LOCKING DEVICE
John J. McCarthy, Weston, Conn., assignor to Norco Incorporated, Ridgefield, Conn., a corporation of Connecticut
Filed Aug. 18, 1961, Ser. No. 132,379
19 Claims. (Cl. 24—211)

This invention relates to quick-release fastening or locking devices, and more particularly to fastening pin or shank structures having readily releasable locking means, such as locking type clevis pins, tie pins and the like.

In the past there have been proposed and produced various types of quick-release locking clevis pins, tie pins, etc. One well known type consisted of an apertured hollow shank having a longitudinally movable plunger which was slidable within it, and having a pair of oppositely projecting steel balls which were controlled by the plunger, said balls being normally retained in protruding position for one setting of the plunger. For another setting of the plunger the balls were retractable in the shank, by virtue of a cam or clearance groove being disposed behind the balls to provide the space for such retraction.

While this well-known construction operated satisfactorily in general, it had a number of drawbacks. For one thing, the spherical configuration of the balls limited severely the working force, as exerted longitudinally of the pin or shank, which they were able to withstand without damage.

For another thing, the said working forces in being applied almost tangentially to the balls exerted, by virtue of a camming action, tremendous pressures on the associated, contacting shank surfaces as well as on the balls, causing cold flow or swaging, and marking or deformation of the surfaces whereby failure could readily occur.

The above drawbacks and disadvantages of this prior type locking pin as above set forth are obviated by the present invention, and one object of the invention is to provide a novel and improved locking pin or shank construction which is especially adapted to withstand relatively heavy and substantial, longitudinal working forces.

Another object of the invention is to provide an improved locking pin or shank construction as above set forth, which may be constructed either as a double-acting device in that the release of the locking member is effected by movement of the control plunger in either a "forward" or "rearward" direction, or else as a single-acting device wherein release is effected by movement of the plunger solely in one direction.

A further object of the invention is to provide an improved locking shank construction as characterized above wherein simplified and reliable spring biasing means is arranged to hold the plunger normally in the locking position thereof.

An additional object of the invention is to provide a novel locking pin or shank construction in accordance with the foregoing, wherein a positive retraction of the protruding abutment portion is effected in response to longitudinal movement or actuation of the plunger.

A feature of the invention resides in the provision of a positive, locking-type pin or shank construction as above characterized, wherein a positive locking action is had both for the single acting and the double acting types involving either uni-directional or bi-directional releasing movement of the plunger.

Another feature of the invention resides in the provision of an improved locking shank construction in accordance with the foregoing, which has all of the advantages listed and is nevertheless relatively small and compact in its construction, and constituted of few and simple parts whereby it may be economically produced and fabricated.

Other features and advantages will hereinafter appear.

In the accompanying drawings, similar characters of reference are used to designate like components throughout the several views, in which:

FIGURE 1 is a view partly in axial section and partly in side elevation, illustrating one embodiment of fastening means as provided by the invention. The device is shown locked, with the release plunger retained in its normal locking position by a pair of helical coil springs. A collar is retained or locked on the shank of the device.

FIG. 2 is an axial sectional view of the fastening means of FIG. 1, shown in its releasing position with the collar in the process of being removed.

FIG. 3 is a transverse sectional view, taken on the line 3—3 of FIG. 1.

FIG. 4 is a transverse sectional view taken on the line 4—4 of FIG. 2.

FIG. 5 is an end elevational view of the fastening means, as seen from the right end when considering FIG. 1.

FIG. 6 is an axial sectional view of a fastening means constituting another embodiment of the invention, wherein a single biasing spring replaces the multiple springs shown in FIGS. 1 and 2.

FIG. 7 is a fragmentary side elevational view of the locking portion of the fastening means of FIG. 6.

FIG. 8 is an axial sectional view of a fastening means constructed in accordance with the invention, illustrating yet another embodiment thereof wherein the release is effected by movement of the release plunger in solely one direction, as distinguished from the bi-directional release movement provided in the forms of the invention illustrated in FIGS. 1-7.

FIG. 9 is an axial sectional view of a fastening means made according to the invention, illustrating yet another embodiment thereof wherein the locking members are in the form of flat lugs, as distinguished from the circular, pin-like locking members shown in FIGS. 1-8.

FIG. 10 is a transverse sectional view, taken on the line 10—10 of FIG. 9.

FIG. 11 is an end elevational view of the fastening means of FIG. 9, looking at the right end thereof as viewed in this figure.

FIG. 12 is a fragmentary view partly in side elevation and partly in section, of a fastening means illustrating a modification of the invention.

Referring first to FIGS. 1-5, the improved fastening means shown therein comprises a shank construction designated generally by the numeral 10, such construction being in the form of a hollow cylindrical body or member 12 having a fixed collar 13, the body 12 being adapted to slidably fit into bored or apertured parts 14 and 15 for the purpose of securing these together. The parts 14 and 15 may be plates or panels, etc., being shown as broken away in the figures. The parts 14 and 15 thus constitute two cooperable elements which are to be either secured together against separation or, when desired, separated by sliding the shank 12 from the parts as illustrated in FIG. 2.

The locking or releasing of the parts 14 and 15 from the body or shank 12 is under the control of a plunger 16 (hereinafter also termed a "release member") which is longitudinally slidable within the shank 12. The plunger 16 may have a manually engageable head or handle 18, as will be understood.

In accordance with the present invention, in conjunction with the shank 12 and plunger 16 there is provided a novel and improved releasable locking device comprising a cam 20 which is operatively connected with the plunger 16, and comprising a locking member designated generally by the numeral 22 and which is carried by and movable laterally of the axis of the shank 12 between protruding and non-protruding positions thereon. The said locking member 22 is in the form of a pin and has exposed abutment portions or heads 24 disposed at its opposite ends, the said abutment portions being operatively connected to the cam so as to be actuated thereby in response to movement of the plunger 16.

Further, the shank 12 has guide means comprising a pair of slots 26 having opposite walls or edges which are engaged with the locking member 22 to guide the latter for the above movement on the shank 12, in a path whereby the abutment portions 24 shift non-radially from a projecting position shown in FIGS. 1, 3 and 5 to a substantially non-projecting or retracted position as shown in FIGS. 2 and 4, and vice versa. The cam 20 effects the said guided movement of the locking member 22 in at least one direction in response to movement of the release member or plunger 16 in one direction.

Where, as illustrated in FIGS. 1 and 2, the cam is of the double acting type, the retraction of the locking member 22 is effected in response to bi-directional movement of the plunger 16 from the position shown in FIG. 1. As seen in FIG. 2, the plunger 16 has been shifted to the left from the FIG. 1 position, thereby effecting a retraction of the locking member 22 to the position shown in FIG. 4. However, the plunger 16 may be also shifted to the right from the FIG. 1 position, to similarly effect a retraction of the locking member 22, by virtue of the double-acting cam 20.

The said organization comprising the cam operated locking means is especially arranged to withstand relatively heavy longitudinal forces which might be imposed on the same, as when the two parts 14, 15 are stressed or pulled to effect a separation thereof. Such forces would also occur, for example, when the shank 12 is pulled to the left as viewed in FIG. 1 while the parts 14, 15 are held against movement.

The locking means is of the double-acting type whereby its release may be effected by either of two opposite movements of the release member, and is characterized by simple and reliable spring biasing means on the said member to hold the same in a normal, locking position. Further, a positive retraction of the protruding abutment portion 24 may be effected, and a positive lock may be had both with a single acting and a double-acting release device, as will be later brought out.

Referring to FIGS. 2, 3 and 4, the cam 20 is shown as comprising an end portion of the plunger 16, such portion having opposite parallel walls 30 between which there is disposed a substantially V-shaped cam slot 32 having pairs of opposite parallel edges 34, 36 and 38, 40 extending angularly in opposite directions along the axis of the shank 12. The locking member 22 is acted on by the said pairs of opposite parallel edges 34, 36, 38 and 40 by virtue of such member extending through the cam slot 32, as seen for example in FIGS. 1 and 2. The cam 20 also has opposite curved bearing surfaces 31 constituting portions of a cylindrical surface, which closely slidably fit the interior cylindrical surface of the shank 12.

The locking member 22 comprises a cylindrical pin body 42 which closely fits the cam slot 32, with the two abutment portions 24 being disposed at the opposite flat side walls 30 of the cam 20 whereby the locking member is positioned and prevented from appreciable axial movement.

Referring to FIG. 2, the cam slot 32 also has a straight, central portion defined by opposite parallel walls 44 and 46, such straight portion extending parallel to the axis of the shank 12, as shown.

Considering now FIGS. 1 and 3 it will be seen that when the plunger 16 is in its normal locking position, the pin 42 will occupy the straight central portion of the cam slot 32 as shown, and the abutment portions 24 of the locking member 22 will protrude from the curved outer surfaces of the shank 12. Accordingly, these abutment portions constitute obstructions which prevent the collar 14 from being slipped from the shank 12 to the right, as viewed in FIG. 1.

Referring now to FIGS. 2 and 4, when the plunger 16 is shifted to the left as seen in FIG. 2 (and as will be effected by the application of forces, represented by the arrows A and B, applied respectively to the parts 18 and 15), it will cause the locking member 22 to travel downward in the two slots 26 of the shank 12 whereby such member will be fully centralized or disposed along a diameter of the shank. For such position, the abutment portions 24 will be wholly contained within the outer surface of the shank 12, whereby no protrusion whatsoever occurs. The parts 14, 15 are now free, and the shank 12 may be readily removed as indicated in FIG. 2, and the parts separated.

It will be noted that the abutment portions 24 occupy the opposite slots 26 in the shank 12 whereby the walls of such slots constitute guide means for the locking member 22 at all times, and limit the movement of such member to the transverse path between the protruding and non-protruding portions of FIGS. 3 and 4. For such movement, the abutment portions 24 travel non-radially or in paths which may be considered as defined by minor chords of the shank 12.

It will be noted that the nature of the V-shaped cam slot 32, by virtue of the opposite parallel walls thereof, effects a positive retracting as well as a positive advancing movement of the locking member 22 as the case may be, depending upon the direction of movement of the plunger 16 and the starting point of the same. Also, when the plunger 16 is in the center position shown in FIG. 1, the locking member 22 will be securely retained in the protruding or blocking position.

Further, the cylindrical configuration of the abutting portions 24 results in a line contact being established between the same and the adjoining edge 48 of the part 14, such line contact starting at the inner periphery of the bore of the part 14 and extending outward, as may be understood from a consideration of FIG. 3. Also, line contacts exist between the abutting portions 24 and the edges of the slots 26 in the shank 12, and a line contact of appreciable length exists between the body 42 of the pin 22 and the surface 46 of the cam 20. Thus there is avoided at all places a theoretical point contact, such as occurs with ball-type locking means of the type wherein the balls are carried in slots and small portions thereof protrude to constitute the obstructing means. There is further avoided the undesirable camming action and consequent high force components which are characteristic of ball-type locks.

In the embodiment of FIGS. 1–5 a pair of helical coil springs 50, 52 is carried by the plunger 16 within the shank 12, such coil springs being aligned with each other and engaging at their adjoining ends an interposed shoulder formation 54 affixed to the plunger 16. The remote ends of the springs 50, 52 engage bushings 56 and 58 which are fixed in the shank 12 as by means of pins 60. The springs 50, 52 maintain the plunger 16 in the normally centralized locking position shown in FIG. 1, and further function to restore such plunger to this centralized position whenever it is shifted either to the right or to the left. In FIG. 2 the plunger 16 is shown as being shifted to the left, compressing the spring 50 and permitting expansion of the spring 52. Upon removal of the unlocking force from the plunger 16, the spring 50 will effect its return to the centralized position of FIG. 1.

It will now be understood that, to effect a separation of the parts 14, 15 it is merely necessary to grasp the enlargement 18 of the plunger 16 and pull on this. The plunger 16 will first move with respect to the shank 12 to the position shown in FIG. 2, whereby the locking member 22 is retracted to the FIG. 4 position, freeing the shank 12 from the parts 14, 15 to enable these to be separated.

The operation of applying the fastener to the parts 14, 15 is also effected in a simple manner. The user merely grasps the knob or handle 18 and applies the front end of the shank 12 to the opening in the parts 15, 14. The user then pushes forward, or from left-to-right as viewed in FIG. 2 which as a consequence of the abutting portions or heads 24 becoming engaged with the left edge of the member 15 effects a movement of the plunger 16 from left-to-right or opposite to the direction indicated by the arrow A in this figure. The condition of the springs 50, 52 will then be reversed, the latter spring being under compression whereas the spring 50 expands. The cam slot 32 will now effect a retraction of the pin 22 whereupon the shank 12 may be fully inserted in the members 14, 15 and ultimately occupy the fastening or operative position shown in FIG. 1. Thus, by a single "push" action the fastening device may be inserted in the members 14, 15, as made possible by the automatic retraction of the locking pin 22.

Another embodiment of the invention is illustrated in FIGS. 6 and 7. Here a single helical coil spring is utilized to bias the release plunger to its normal, locking position, as distinguished from the two biasing springs illustrated in FIGS. 1 and 2. Parts which are in general similar to those already described above have been given like numerals but with the suffix "a" to distinguish them. In FIGURES 6 and 7 there is shown a shank construction 10a which may be in the form of a clevis pin and which comprises a cylindrical body 12a having an enlarged end or head 13a. The body 12a passes through parts 14a and 15a and has a pair of oppositely disposed slots 26a in which there is carried a locking member 22a.

Longitudinally slidable in the pin 10a is a plunger 16a having a manually engageable head 18a, said plunger further having a cam portion 20a at its inner end, which is slidable in the bore of the shank body 12a. The cam 20a has a V-shaped cam slot 32a generally similar to the cam slot 32 already described.

As stated, the embodiment of FIG. 6 employs a simple spring biasing means to yieldably hold the plunger 16 in the normal locking position shown. To effect this, the plunger 16 is provided with a portion 17 of enlarged diameter, forming a shoulder against which a washer 62 is disposed. A second washer 64 (also carried by the plunger 16a) is disposed against a collar 66 affixed to the plunger, as by press-fitting. Between the washers 62 and 64, a single helical compression spring 68 is disposed, carried by the plunger 16a.

Within the body 12a bushings 70 and 72 are affixed, as by a press-fit, such bushings being engaged by the washers 64 and 62 respectively. The spring 68 is normally under a slight amount of compression. With such construction, the spring-charged washers 62, 64 by engagement respectively with the bushings 72, 70 will normally yieldably hold the plunger 16a in the position shown. However, the plunger may be shifted either to the left or to the right, resulting in a compression of the spring 68 which will thereafter return the plunger to its centralized position upon removal of the shifting force. The shifting of the plunger to either the left or to the right will move the cam 20a so as to retract the locking member 22a, all in the manner similar to that already described above in connection with the embodiment of FIGS. 1–5.

Another embodiment of the invention, having a single-acting release member, is illustrated in FIG. 8. In this figure, the shank construction 10b is also in the form of a clevis pin, having a cylindrical body 12b and an enlargement or head 13b, the body 12b extending through parts 14b and 15b.

Longitudinally movable in the body 12b is a plunger 16b having a manually engageable head 18b, the said plunger having a cam 20b provided with a cam slot 32b of angular configuration. The cam slot 32b has a portion 33 disposed at an angle to the axis of the shank 12b, and a second portion 35 which is parallel to the shank axis and which acts as the locking portion of the slot. A locking member 22b extends through the slot 32b as shown.

Within the shank 12b there is an internal annular shoulder 76, which is engaged by one end of the helical compression spring 78. The other end of the spring 78 engages a washer assemblage 80 affixed to the plunger 16b, such assemblage also engaging a fixed bushing 82 press-fitted in the shank 12b. With such construction the plunger 16b may be shifted from the locking position shown in FIG. 8 to the right, whereupon the cam slot 32b will move the locking member 22b to its centralized or non-protruding position, thereby to release the parts 14b and 15b. It is thus seen that the fastening device of FIG. 8 is of the single acting type, in that release is effected by solely left-to-right movement of the plunger 16b, as viewed in this figure.

Another embodiment of the invention is illustrated in FIGS. 9–11, wherein a modified form of locking member is utilized which provides much greater resistance and strength as compared with the line contact members of the preceding embodiments.

Referring to FIG. 9, the fastening device shown is in the form of a cylindrical pin having a shank portion 12c passing through parts 14c and 15c and being provided with an enlarged end or head 13c, and with oppositely disposed slots 26c to accommodate the locking member.

Longitudinally movable in the shank 12c is a plunger 16c carrying a centralizing spring 84 which at one end engages a washer assemblage 80c affixed to the plunger 16c. The washer assemblage 18b engages a fixed bushing 82c in the shank, and the remaining end of the spring 84 engages a washer 86 which is slidable on the plunger and positionable against a shoulder 88 thereof. The washer 86 is also engageable with an internal annular shoulder 90 of the shank 12c. Accordingly, such organization yieldably holds the plunger 16c in the locking position shown, the plunger being shiftable to the right against the action of the spring 84 to release the locking member.

In accordance with the invention, a novel heavy-duty locking member 22c is provided, which presents relatively large, stress-resisting surfaces on its abutting portions, thereby to enable much greater longitudinal forces to be withstood without failure.

Referring to FIG. 10, the abutting portions of the locking member 22c are seen as constituted of two flat lugs 24c, the said lugs being of segmental, semi-circular shape and substantially like quadrants of a circle. The lugs 24c are joined to each other by a round shank or pin 42c which extends through the cam slot 32c in the cam 20c affixed to the inner end of the plunger 16c. The flat lugs 24c closely slidably fit in the slots 26c of the shank, and present relatively large abutting surfaces to the part 14c whereby stronger forces may be withstood before failure of the fastening device.

It will be understood that to release the parts 14c, 15c it is merely necessary to depress or shift the plunger 16c from left-to-right, whereupon the cam slot 32c will retract the locking member 22c so that the flat lugs 24c thereof will no longer protrude from the surface of the shank 12c. The parts 14c, 15c will then be free for separation.

Still another embodiment of the invention is illustrated in FIG. 12, wherein a transversely movable locking pin is so arranged as to provide an increased bearing or load surface for engagement with the adjoining edge of the member 14. In this figure the locking pin 22d has enlarged ends or heads 24d which are partially circular but have two opposite flats or faces 24e, said ends being arranged to shift slidably in the guide slots 26 of the shank 12d. It will be understood that the slots 26d in the shank 12d are not quite as wide as the slots 26 in the shank 12 shown in FIGS. 1 and 2, the reason being that the locking heads 24d have a lesser dimension between the flats or faces 24e than the diameters of the heads 24 shown in FIGS. 1 and 2. With the construction of FIG. 12, the flats 24e provide a much greater bearing surface for engagement with the adjoining edges of the parts 14, 15 during both the application and removal of the fastening pin, as compared with the embodiment of FIGS. 1-5. Otherwise, the construction and operation of the fastening device of FIG. 12 are the same as that already described above in connection with the mentioned previous figures.

It will be seen from the foregoing that I have provided novel and improved fastening means comprising essentially a shank construction, a relatively movable release member movable with respect to the shank and having a cam, and further comprising a locking member provided with exposed abutment portions which are operatively connected to the cam, the shank having guide means engaged with the locking member so that the abutment portions thereof move substantially non-radially from projecting positions to non-projecting positions and vice versa in response to movement of the release member. The construction is such that relatively large axial or longitudinal forces may be successfully withstood by the locking member, due to the increased surface areas on which the forces are impressed. The construction is relatively small and compact, and the devices of the various embodiments are reliable in operation, and capable of long, useful life. Relatively few components of only simple construction are involved, whereby manufacturing costs are held to a minimum.

Variations and modifications may be made within the scope of the claims, and portions of the improvements may be used without others.

I claim:

1. Fastening means comprising a shank; a release member movable with respect to the shank and having a cam which is movable in a direction along the axis of the shank; and a single elongate locking member all portions of which are immovable with respect to each other, said locking member being carried by, and movable laterally of the axis of, the shank between positions thereon wherein it protrudes laterally at the side of the shank or does not protrude at all from the shank, said locking member having at its two ends exposed abutment portions and being operatively connected to said cam to be actuated thereby, said shank having guide means engaged with the locking member to guide the latter for said movement and in a path whereby the said two abutment portions of the locking member simultaneously move non-radially and in parallel directions along straight lines from projecting positions to substantially non-projecting, retracted positions on the shank and from said substantially non-projecting, retracted positions to said projecting positions, said cam effecting said guided movement of the locking member in at least one direction in response to movement of the release member in one direction.

2. A fastening means as in claim 1, wherein the cam has a straight edge portion extending parallel to the axis of the shank, for positively holding the locking member in projecting position and against accidental retraction.

3. Fastening means comprising a shank; a release member movable with respect to the shank and having a cam which is movable in a direction along the axis of the shank; and a single elongate locking member all portions of which are immovable with respect to each other, said locking member being carried by, and movable laterally of the axis of, the shank between protruding and non-protruding positions thereon, said locking member having at its two ends exposed abutment portions and being operatively connected to said cam to be actuated thereby, said shank having guide means engaged with the locking member to guide the latter for said movement and in a path whereby the said two abutment portions of the locking member simultaneously move non-radially and in parallel directions along straight lines from projecting positions to substantially non-projecting, retracted positions on the shank and from said substantially non-projecting, retracted positions to said projecting positions, said cam effecting said guided movement of the locking member in at least one direction in response to movement of the release member in one direction, said cam comprising a member having a slot provided with opposite parallel edges extending at an angle with respect to the axis of the shank, and said locking member passing through said slot and being acted on by said opposite edges.

4. Fastening means comprising a shank; a release member movable with respect to the shank and having a cam which is movable in a direction along the axis of the shank; and a single elongate locking member all portions of which are immovable with respect to each other, said locking member being carried by, and movable laterally of the axis of, the shank between protruding and non-protruding positions thereon, said locking member having at its two ends exposed abutment portions and being operatively connected to said cam to be actuated thereby, said shank having guide means engaged with the locking member to guide the latter for said movement and in a path whereby the said two abutment portions of the locking member simultaneously move non-radially and in parallel directions along straight lines from projecting positions to substantially non-projecting, retracted positions on the shank and from said substantially non-projecting, retracted positions to said projecting positions, said cam effecting said guided movement of the locking member in at least one direction in response to movement of the release member in one direction, said shank having a transverse slot-shaped hole through it the edges of which constitute the said guide means, and said locking member comprising a pin extending laterally of the shank through the said hole thereof, with the said abutment portions adapted to project from both ends of said hole beyond the surfaces of the shank for the said laterally-projecting position.

5. A fastening means as in claim 4, wherein the said pin has enlarged rounded ends provided with flats and constituting the said abutment portions.

6. A fastening means as in claim 4, wherein the said pin has enlarged round ends constituting the said abutment portions.

7. A fastening means as in claim 6, wherein the guide edges of said slot-shaped hole engage the enlarged round ends of the pin to guide the latter.

8. A fastening means as in claim 7, wherein the shank has a longitudinal bore, wherein the release member comprises a bar disposed and slidable in said bore, wherein said cam comprises a slotted portion of said bar, and wherein the said locking pin extends through the slot of the cam.

9. A fastening means as in claim 1, wherein the release member has a second cam movable along the axis of the shank and facing oppositely with respect to the first-mentioned cam, said second cam being operable to effect the said guided movements of the locking member in response to opposite movement of the release member.

10. A fastening means as in claim 9, wherein the cams comprise a member having a substantially V-shaped slot through which the locking member passes, said slot having pairs of opposite parallel edges extending angularly in opposite directions along the axis of the shank, the locking member being acted on by said opposite edges.

11. A fastening means as in claim 10, wherein the V-shaped slot has an edge portion extending parallel to the shank axis and disposed between the said pairs of parallel edges, to effect a positive lock of the locking member in projecting position.

12. A fastening means as in claim 9, wherein there are spring means biasing the release member to a position wherein the locking member is in projected position.

13. A fastening means as in claim 12, wherein the spring means comprises a single spring, a pair of spaced fixed abutments on the release member, and a pair of slidable abutments on said member, arranged to respectively engage the fixed abutments and the said spring.

14. A fastening means as in claim 12, wherein the spring means comprises a pair of aligned springs on the release member and an abutment carried by said member and interposed between the springs to be acted on by either spring depending on the direction of movement of the diameter.

15. A fastening means as in claim 1, wherein the locking member comprises a flat lug having opposite substantially parallel sides and a substantially uniform thickness, and in which the guide means on the shank comprises a slot having parallel walls, in which the lug slides.

16. A fastening means as in claim 15, wherein the shank has a longitudinal bore in which the release member is slidable, wherein the cam comprises a portion of the release member having an angular slot, wherein the shank has a second slot, and wherein the locking member passes through the angular cam slot and has a second flat lug disposed in and slidable along the second slot of the shank.

17. A fastening means as in claim 16, wherein the flat lugs are of segmental, semi-circular shape, being substantially quadrants of a circle.

18. A fastening means as in claim 1, wherein the shank has a longitudinal bore in which the release member is slidable, and wherein the cam comprises a portion of the release member having a slot extending angularly with respect to the shank axis, said locking member comprising a pin extending through the said slot.

19. A fastening means as in claim 18, wherein there is a spring device biasing the release member to an end position on the shank which maintains the locking member in projecting position.

References Cited by the Examiner

UNITED STATES PATENTS

| 2,324,687 | 7/43 | Finkle | 85—3 |
| 2,350,550 | 6/44 | Finkle | 85—5 |
| 2,572,022 | 10/51 | Francis | 85—3 |
| 2,620,537 | 12/52 | Gobin-Daude | 24—213 |
| 3,079,829 | 3/63 | Chester | 85—5 |

FOREIGN PATENTS 41,337   9/16   Sweden.

DONLEY J. STOCKING, *Primary Examiner.*

ABRAHAM G. STONE, *Examiner.*